3,448,006
CONTROL ROD DRIVE SYSTEM
Peter Fortescue, Rancho Santa Fe, Richard J. Ringsmuth, Solana Beach, and George M. Schultz, La Jolla, Calif., assignors, by mesne assignments, to Gulf General Atomic Incorporated, San Diego, Calif., a corporation of Delaware
Filed June 7, 1967, Ser. No. 644,251
Int. Cl. G21c 7/14
U.S. Cl. 176—36     6 Claims

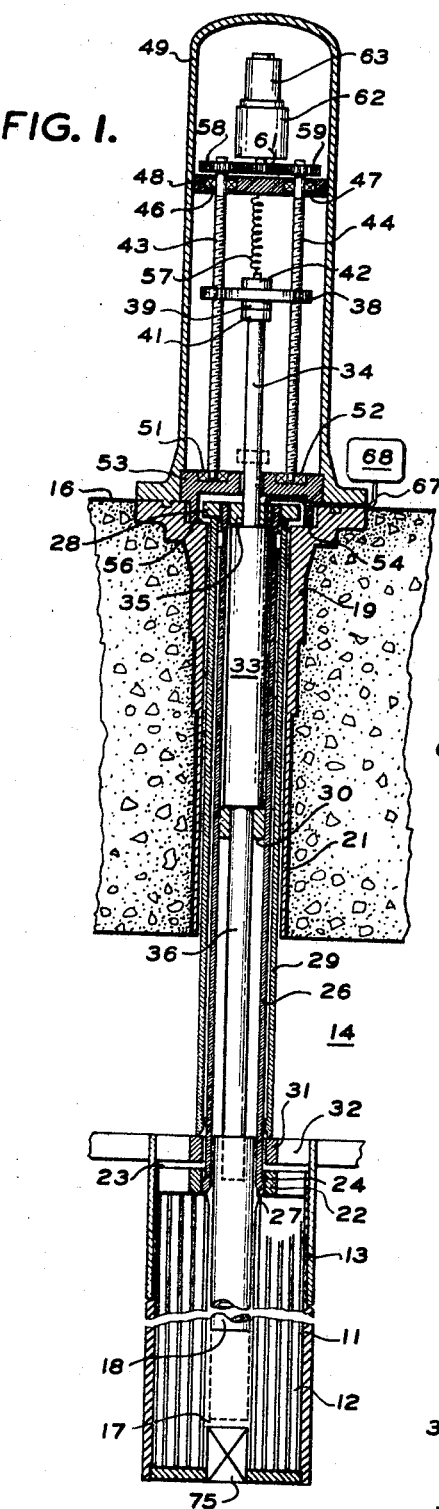
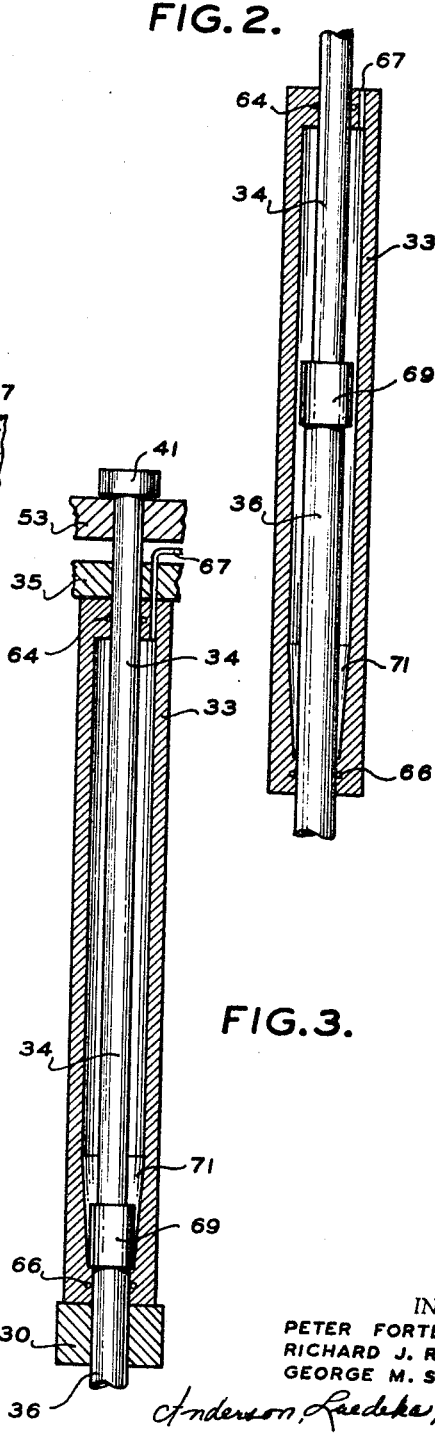
FIG. 1.
FIG. 2.
FIG. 3.
INVENTORS
PETER FORTESCUE
RICHARD J. RINGSMUTH
GEORGE M. SCHULTZ
ATTORNEYS United States Patent Office 3,448,006
Patented June 3, 1969

ABSTRACT OF THE DISCLOSURE

A control rod drive system for a nuclear reactor is described which utilizes a differential piston with a constant fluid pressure bias thereon. The piston immediately drives the control rod into the core upon release of a latch in response to a scram signal. During normal control rod drive operation, the piston and control rod are coupled by the latch to a normal drive mechanism. An enlarged section or snubbing device on the piston rod cooperates with a tapered portion of the cylinder to brake the control rod at the end of its scram travel.

---

The present invention relates to a control rod drive arrangement for a nuclear reactor and, more particularly, to such an arangement which is capable of controlling the position of the control rod during normal operation, as well as rapidly moving the control rod into the reactor in the event of emergency scramming of the reactor.

The use of control rods for regulating the power output of a nuclear reactor and for emergency scramming or shutting down the nuclear reactor, is well known. Such control rods usually comprise movable elongated cylinders incorporating neutron absorbing materials. Generally, control rod drive systems include a reversible electric or hydraulic motor drive which is utilized to effect operating adjustments in the position of a control rod relative to the reactive core of the nuclear reactor. The control rod drive system may also have provision for rapidly advancing the control rod into the reactive core in response to a prearranged signal to effect emergency shutdown or scramming of the reactor.

Some types of control rod drives systems have relied upon gravity in order to effect scramming of a control rod. Under some circumstances, the force of gravity may not be sufficient to insure proper insertion of a control rod at all times a scram is necessary. Accordingly, various expedients for effecting a positive drive of the control rod during scram conditions have been devised. Among these are hydraulic and pneumatic systems.

For safety reasons, it may be desirable to maximize the rate of scram insertion of a control rod from a working position. However, excessive velocity buildup only aggravates energy dissipation problems and incurs general wear and tear on guidance elements unnecessarily. Therefore it is desirable that the rod scram stroke be composed of a minimal initial hesitation and a rapid and uniform acceleration followed by a final deceleration. The acceleration is selected to provide the required insertion rate and still not require an excessive deceleration rate. The deceleration rate depends upon the distance available for deceleration. In a fast reactor the insertion of several inches of all of the rods is sufficient to shut the reactor down. Therefore, within reason, the deceleration distance can be selected to give almost any deceleration rate desired.

Control rod drive systems have heretofore been devised utilizing various types of drives, such as hydraulic piston drives or screw type motor operated drives, for supporting and precisely positioning the control rods during normal operation. Moreover, hydraulic or pneumatic drive systems for effecting positive scram have heretofore been combined with such normal operation drive systems. Such previous combination drive systems have, however, not fulfilled entirely the desirable characteristics set forth above.

Accordingly, it is an object of this invention to provide an improved control rod drive system for a nuclear reactor.

Another object of the invention is to provide a control rod drive system having provision for fine adjustment, positive drive scram, and satisfactory control rod snubbing at the end of scram travel.

Another object of the invention is to provide a control rod drive system imparting to the control rod, during scram, a minimal initial hesitation, a rapid uniform acceleration, and a final deceleration.

Other objects of the invention will become apparent to those skilled in the art from the following description taken in connection with the accompanying drawings wherein:

FIGURE 1 is a full section side view illustrating a control rod drive system constructed in accordance with the invention;

FIGURE 2 is an enlarged sectional view of a scram cylinder and internal components utilized in the system of FIGURE 1; and FIGURE 3 is an enlarged sectional view similar to FIGURE 2 and illustrating the elements of the system in fully scrammed condition.

A control rod drive system for a nuclear reactor in accordance with the present invention includes means 38 and 62 for supporting and adjusting a control rod 18 with respect to the reactor core 11 and further means 39 and 41 for coupling the control rod to the adjusting means. The coupling means are releasable in response to a scram signal to decouple the control rod from the adjusting means. Rod means interconnect the control rod to the coupling means. The rod means include two aligned sections 34 and 36 of different cross sectional areas, with the smaller of the sections being positioned toward the latch. A cylinder 33 is disposed around at least parts of the two rod sections. The cylinder is fixed with respect to the reactor core and means 68 are provided for maintaining a fluid under constant pressure in the cylinder for displacing the rod means toward the reactor core upon release of the latch.

In a preferred form of the invention, a cylindrical member 69 is disposed between the two rod sections 34 and 36 and is of larger cross sectional area than either. The cylinder 33 is displaced from the cylindrical member sufficiently to permit fluid to flow freely between the cylindrical member and the cylinder. The lower portion 71 of the cylinder is internally tapered toward the core to provide a snubbing or decelerating force on the cylindrical member at the lower end of the cylinder.

Referring now more particularly to FIGURE 1, the control rod drive system of the invention is illustrated in connection with one form of reactor which includes a reactive core comprised of a plurality of fuel modules or boxes 11. The boxes contain suitable fuel rods 12 and are positioned and supported on a grid structure 13. The grid structure 13 extends transversely of the interior compartment 14 of a prestressed concrete reactor vessel 16. The illustrated fuel module has a central interior passageway 17 therein to permit a control rod 18 to be moved in and out of the reactor core for controlling the reactivity thereof.

It is to be understood that, although the foregoing described reactor structure is of advantage under certain circumstances, other reactor structures may also utilize the invention to advantage. The described structure is set forth only as being illustrative of a particular reactor structure in which the invention may be used.

The prestressed concrete reactor vessel 16 has a penetration 19 therein which is provided with a stepped liner 21 of a suitable material such as stainless steel. The fuel module 11 has, at its upper end, a collar 22 which is supported by four webs 23 extending diagonally from the four corners of the fuel module. The interior of the collar 22 has a plurality of inwardly extending projections 24 and comprises the female portion of a releasable or breech type coupling. The upper ends of the fuel modules fit in the square spaces formed by the grid 13 and each is suspended on a supporting sleeve 26. The lower end of the supporting sleeve constitutes the male portion of a breech type coupling and has a plurality of outwardly turned projections 27 which are adapted to be positioned underneath the projections 24 on the collar 22 for attaching to the fuel module. The projections 27 are adapted to pass between the projections 24, when the sleeve 26 is turned sufficiently, in order to release the fuel module and permit removal thereof from the reactor core.

The upper end of the support sleeve 26 is threaded into the interior of a nut 28. A load transfer sleeve 29 surrounds the support sleeve 26 and is coaxial therewith. The nut 28 projects a sufficient distance from the support sleeve 26 to extend over the upper end of the load transfer sleeve 29. The lower end of the load transfer sleeve rests upon a collar 31 which is supported, at the top end of a square space defined by the grid structure 13, by a plurality of webs 32. The webs 32 extend from the four corners of the grid shtructure to support the collar centrally of the square space. By sufficiently tightening the nut 28, the load or weight of the fuel module 11 may be transferred, through a clamping action on grid 13, a tensile stress on the support sleeve 26 and a compressive stress on the load transfer sleeve 29, to a bearing load on the top of the grid structure 13. Thus, although the fuel module is supported interiorly of the reactor vessel 16 in the compartment 14 by the grid plate 13, it is possible to manipulate the support sleeve 26 from outside of the reactor vessel 16 to lower and raise and decouple the fuel module.

A cylinder 33 is supported and positioned on a radiation shield plug 30 which is suitably attached to the inner wall of the support sleeve 26. A threaded plug 35 with hydraulic lines is threadably secured to the support sleeve 26 at the top of the cylinder 33.

The internal elements of the cylinder 33 will be described subsequently. With the fuel module 11 supported and clamped in position for operation, the cylinder 33 is fixed in position with respect to the reactor core. An upper piston rod 34 extends from the upper end of the cylinder 33 and a lower piston rod 36 extends from the lower end of the cylinder 33. The upper and lower piston rods pass through suitable openings in the plugs 35 and 30, respectively. Inside the cylinder 33, the rods 34 and 36 respectively connect with opposite ends of a short cylindrical member 69 (see FIGURE 2) which has a diameter greater than that of either of the rods but less than the internal diameter of the cylinder 33. As will be explained, these rods are free to move axially within the cylinder in response to certain mechanical and hydraulic operations. The lower piston rod 36 is connected to the control rod 18 by a breech type coupling. In the illustrated system, the upper piston rod 34 is connected to a drive plate 38 by a magnetic latch, although some other type of releasable latch may also be satisfactory. The upper piston rod is of a length which prevents the member 69 from engaging the top of the cylinder.

The illustrated magnetic latch which connects the rod 34 to the plate 38 includes a pair of separable elements 39 and 41. The latch also includes an electromagnetic coil 42 and suitable electrical connection 57 is made to the coil for energizing same. Upon energization of the coil, the elements 39 and 41 are held securely together by magnetic force. With the magnetic latch thus engaged, the control rod 18 is rigidly coupled through the lower rod 36 and the upper rod 34 to the plate 38. Vertical movement of the plate will thereby effect a corresponding vertical movement of the control rod.

In order to accomplish vertical movement and positioning of the plate 38 in a predetermined manner during normal reactor operation, a screw drive mechanism is provided. The screw drive mechanism includes a pair of drive screws 43 and 44 which pass through the plate 38 and are in threaded engagement therewith. Suitable guide means, not shown, are provided to stabilize the plate 38 as it travels up and down on the screws 43 and 44. The upper ends of the screws 43 and 44 are journalled in bearings 46 and 47, respectively, in an upper bearing plate 48. The upper plate 48 is supported in a housing 49 and a lower bearing plate 53 is clamped to the top of the reactor vessel 16 by the housing 49 and the housing is sealed to the liner 21 to seal the penetration 19.

The lower ends of the screws 43 and 44 are journalled in bearings 51 and 52, respectively, in the lower bearing plate 53. The lower bearing plate 53 extends transversely of the housing 49 and has a downwardly extending cylindrical or locking section 54. The section 54 is accommodated within an enlarged section 56 formed by the liner 21, and is located and secured against turning by suitable interlocking fingers, not shown.

Rotation of the screws 43 and 44 in opposite directions will cause the plate 38 to move up and down and thereby position and support the control rod 18 in a desired manner. Coiled electrical leads 57 extend from the plate 38 (actually the top of the electromagnet 42) to the underside of the upper plate 48. The screws are rotated, respectively, by gears 58 and 59 which are both driven by a drive gear 61. The drive gear is rotated by a synchronous reversible drive motor 62, and a suitable remote reading positioning indicator 63 is mounted to be operative with the drive motor and indicate the position of the plate 38 and hence the control rod 18.

Referring now to FIGURES 2 and 3, the elements on the interior of the cylinder 33 may be seen. Each end of the cylinder 33 is sealed by annular seals 64 and 66 which enable the rods 34 and 36 to slide axially through the closed ends of the cylinder. The diameter of the rod 36 is larger than the diameter of the rod 34 and, consequently, the cross sectional area occupied by the rod 36 is larger than that occupied by the rod 34. The result is a differential piston wherein, when fluid pressure is applied in the cylinder 33, a downward force is exerted on the rods. A suitable passage, indicated at 67, is provided for connecting the interior of the cylinder 33 with a source of hydraulic pressure 68, such as, for example, a reservoir having a constant head of pneumatic pressure. This pressure is constantly maintained within the cylinder 33 and thereby exerts a constant downward bias on the rods 34 and 36.

In the event of an emergency situation in the reactor operation whereupon immediate shutdown of the reactor is necessary, rapid control rod insertion is initiated by a signal emanating from a suitable scram signal source, not shown. The scram signal source may be one or several of various detection instruments which continually monitor the reactor for indications of abnormal operation. Instruments for this purpose are well understood in the art. Upon the initiation of a scram signal, suitable switch means, not illustrated, cause the magnetic latch to be de-energized. With a holding force no longer available between the plate elements 41 and 39, the element 41 is free to move downwardly despite the fixed support of the plate 38 on the screws 43 and 44. Due to the bias of fluid pressure, downward movement of the control rod will thereby occur almost immediately upon the initiation of a scram signal. This movement of the control rod 18 into the core begins with minimal delay or hesitation. The acceleration of the control rod may be placed at the desired level by properly selecting the difference in diameters between the rods 36 and 34 and the pressure of fluid in the cylinder 33.

Once the magnetic latch is released upon initiation of a scram, the control rod will accelerate and be driven into the core. It is desirable that the control rod, which is ordinarily quite heavy, be stopped in a manner that avoids high impact forces on the various structural elements. The lower end of the cylinder 33 is provided with an internally tapered section 71. This section provides a gradual taper of the walls of the cylinder until, at the bottom, the diameter of the cylinder is approximately equal to the diameter of the member 69. In normal reactor operation of the control rod drive system, fluid in the cylinder 33 may flow around the member 69 and will not prevent movement of the rods 34 and 36 in response to movement of the plate 38. During a scram, however, fluid pressure drives the member 69 downwardly. As the member 69 moves into the tapered section 71, the pressure on the underside of the member will increase due to the diminishing area available for passage of fluid around the member. The taper is selected such that this increasing pressure will exert a desired snubbing or braking force on the member to bring the control rod and its associated elements to a stop before high impact damage can result.

If the control rod extends vertically downwardly into the core, the scram movement of the rod is, of course, assisted by gravity.

After a scram, and assuming that reactor conditions have returned to normal and a dangerous condition no longer exists, the control rod may be withdrawn from the scram position in the reactor core in a simple manner. The plate 38 is moved downwardly by rotating the screws 43 and 44 until the elements 39 and 41 are once again in engagement. Energization of the magnetic latch will thereby couple the control rod to the plate 38, and the motor 63 may be reversed to draw the control rod upwardly out of the fuel module in which it is disposed.

By way of example, satisfactory results may be obtained in a gas-cooled reactor with a vertical control rod travel by using the control rod drive system of the invention. The upper piston rod 34 may be about ⅞-inch diameter, the lower rod 36 about 1-inch diameter, and the maximum inner diameter of the cylinder 33 about 1 3/16-inches diameter. (The member 69 may be about 1⅛-inches diameter.) Where the average coolant pressure in the system is about 1,000 p.s.i., a total hydraulic fluid pressure of 2,000 p.s.i. may be used, with a maximum drop of 100 p.s.i. With a four foot core, the control rod stroke during normal and scram action may be four and one half feet. If desired, a suitable crushable shock absorber 75 may be positioned to stop the control rod in the event of a failure and consequent free fall. Allowing for the latter, a total control rod movement of five feet may be allowed for to permit pick up of the rod after a failure by re-engaging the magnetic latch. Acceleration of the rod may be about 3 g. total until deceleration, and deceleration may be about 4 g. The amount of hydraulic fluid transferred to the cylinder during scram may be very small.

It may therefore be seen that the invention provides an improved control rod drive system for a nuclear reactor. The system has provision for fine adjustment of the control rod, provides a positively driven scram, and provides for snubbing or braking the control rod travel at the end of a scram. The movement of the control rod during scram has a minimal initial hesitation because of the constant bias provided by the hydraulic fluid supply 68 which produces a uniform acceleration of the control rod during scram.

Various other embodiments of the invention in addition to those shown and described herein will be apparent to those skilled in the art from the foregoing description and accompanying drawings. Such other embodiments, and modifications thereof, are intended to fall within the scope of the appended claims.

What is claimed is:

1. A control rod drive system for a nuclear reactor, comprising means for supporting and adjusting a control rod with respect to the reactor core, and means for coupling the control rod to said supporting and adjusting means, said coupling means including a latch releasable in response to a scram signal to decouple the control rod from said supporting and adjusting means, rod means interconnecting the control rod to said latch, said rod means having two aligned sections of different cross sectional areas with the smaller of said sections being positioned toward aid latch, a cylinder disposed around at least parts of said two sections, said cylinder being adapted to be mounted in fixed position with respect to the reactor core, and means for maintaining a fluid under constant pressure in said cylinder for rapidly displacing said rod means toward the reactor core upon release of said latch.

2. A system in accordance with claim 1 wherein a cylindrical member is disposed between said two sections and is of larger cross sectional area than either, wherein said cylinder is displaced from said member sufficiently to permit fluid to flow between said member and said cylinder, and wherein the lower portion of said cylinder is internally tapered toward the core to provide a stopping force on said member at the lower end of said cylinder.

3. A system in accordance with claim 2 wherein the minimum diameter of said tapered portion is approximately equal to the diameter of said member.

4. A system in accordance with claim 1 wherein said supporting and adjusting means comprise a screw drive mechanism.

5. A system in accordance with claim 1 wherein said latch is electromagnetic and comprises two separable elements, and wherein the scram signal operates to de-energize said latch and permit said elements to separate.

6. A system in accordance with claim 5 wherein said latch is adapted to be energized after a scram, whereby said control rod may be recoupled to said supporting and adjusting means by moving said supporting and adjusting means to bring said separable elements together.

References Cited

UNITED STATES PATENTS 2,880,155  3/1959  Lichtenberger et al. ___ 176—36
3,162,579  12/1964  Thomas et al. _____ 176—36

OTHER REFERENCES

Nucleonics, vol. 13, June 1955, pp. 48–51.

BENJAMIN R. PADGETT, *Primary Examiner.*

H. E. BEHREND, *Assistant Examiner.*